United States Patent [19]
Burke et al.

[11] Patent Number: 5,568,723
[45] Date of Patent: Oct. 29, 1996

[54] LONG LIFE CATALYTIC GAS GENERATOR FOR SPACE PROPULSION APPLICATIONS

[75] Inventors: William K. Burke, deceased, late of Bellevue, by Sherald M. Burke, legal representative; Charles R. Roberts, Woodinville; Freely R. Schwam, Bellevue, all of Wash.

[73] Assignee: Olin Corporation, Redmond, Wash.

[21] Appl. No.: 941,620

[22] Filed: Sep. 8, 1992

[51] Int. Cl.⁶ ..................................................... F02K 11/00
[52] U.S. Cl. ...................................... 60/203.1; 60/39.462
[58] Field of Search ................................... 60/203.1, 218, 60/39.462

[56] References Cited

U.S. PATENT DOCUMENTS

| | | |
|---|---|---|
| 3,170,290 | 2/1965 | Webb ........................................ 60/257 |
| 3,871,828 | 3/1975 | Ellion et al. ........................... 60/39.462 |
| 4,461,144 | 7/1984 | Field ..................................... 60/39.462 |
| 4,490,972 | 1/1985 | Ellion et al. ........................... 60/39.462 |
| 4,800,716 | 1/1989 | Knowles et al. . |
| 4,856,271 | 8/1989 | Burke . |
| 4,866,929 | 9/1989 | Knowles et al. . |
| 4,882,465 | 11/1989 | Smith et al. . |
| 4,926,632 | 5/1990 | Smith et al. . |
| 4,938,932 | 7/1990 | Burke . |
| 4,995,231 | 2/1991 | Smith et al. . |
| 5,076,051 | 12/1991 | Naff . |

Primary Examiner—Louis J. Casaregola
Attorney, Agent, or Firm—Gregory S. Rosenblatt; Robert S. Hauser

[57] ABSTRACT

A catalytic gas generator for an electrothermal thruster comprises a catalyst chamber, a capillary propellant tube communicating to the chamber and a tubular thermal standoff connecting the tube to the chamber wherein the tube is connected at a location spaced from the tube inlet into the catalyst chamber.

7 Claims, 3 Drawing Sheets

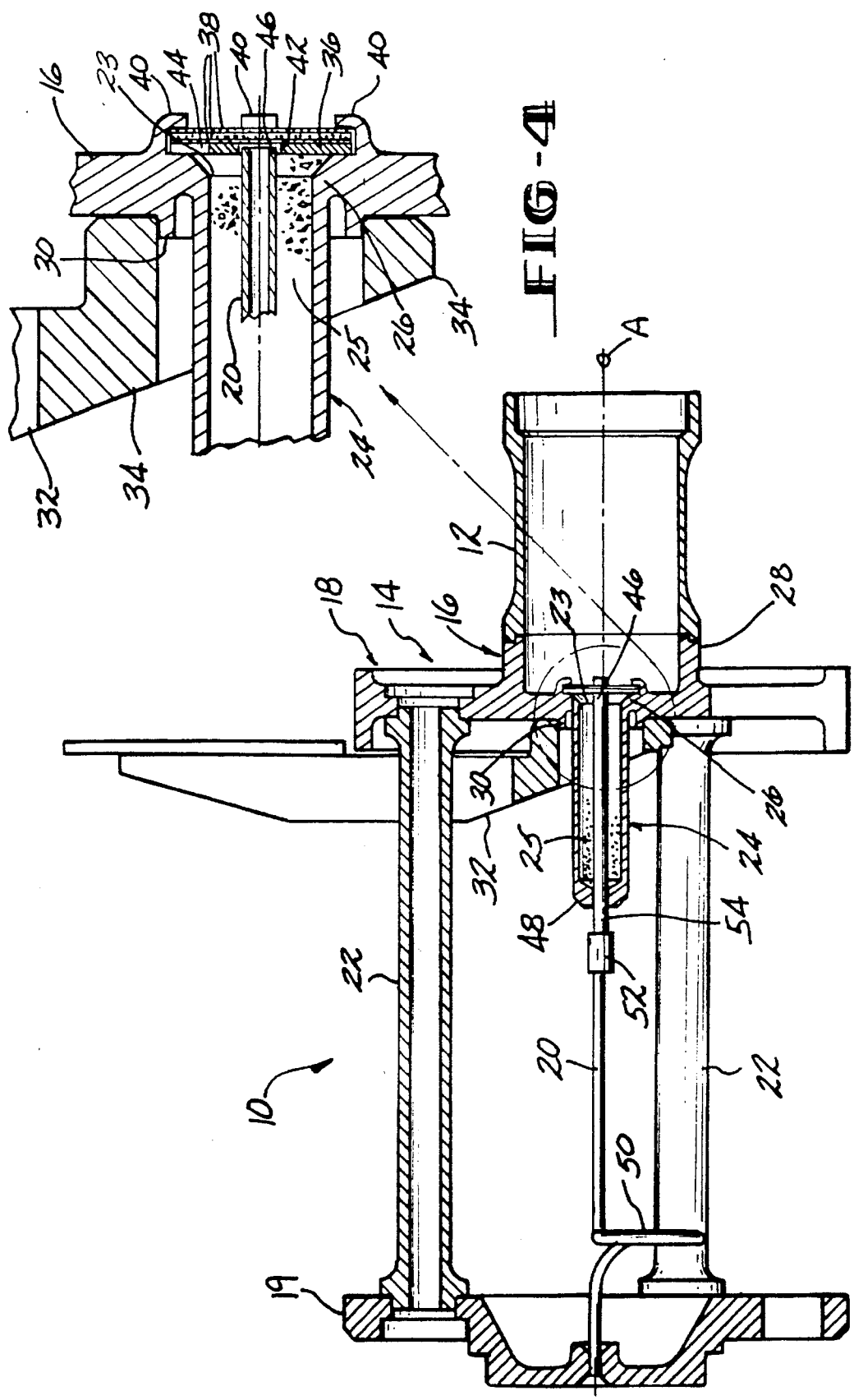

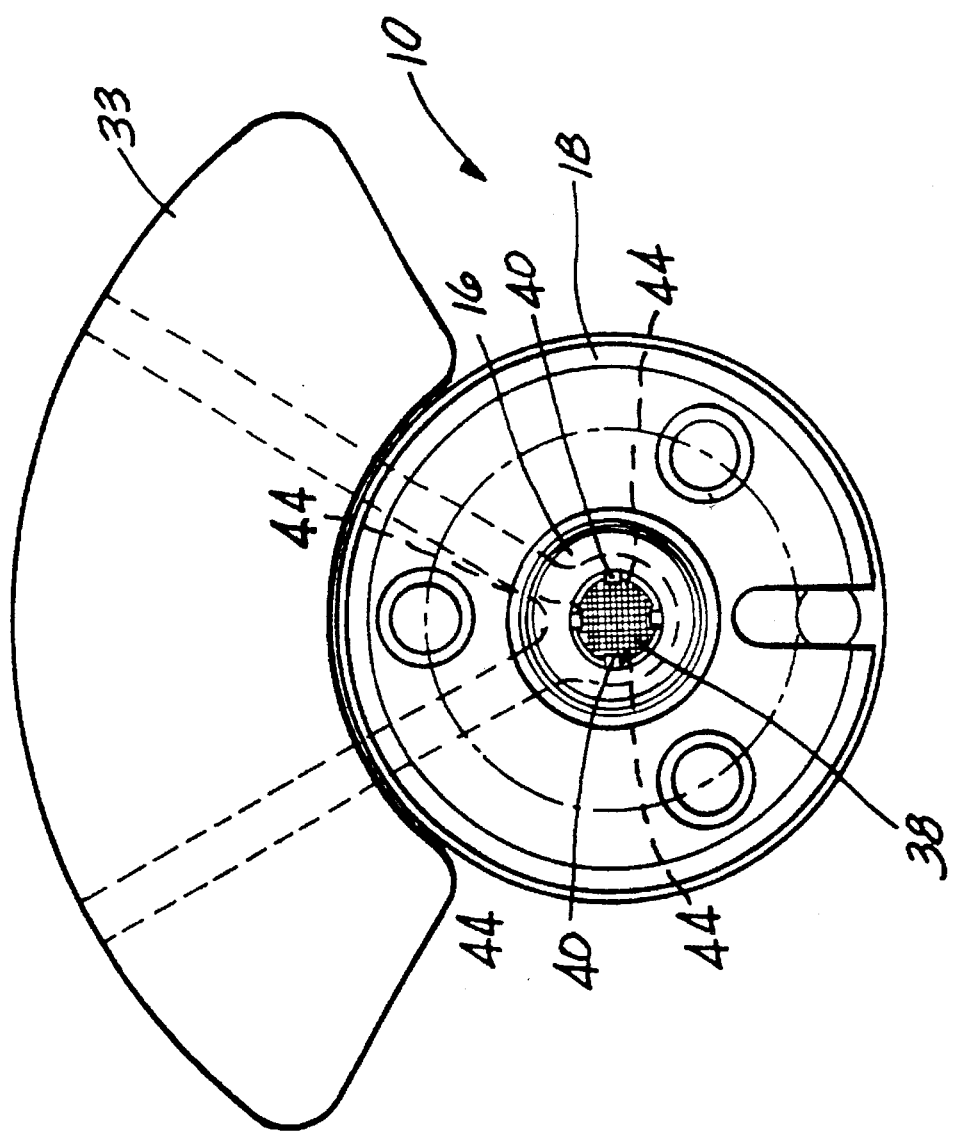

LONG LIFE CATALYTIC GAS GENERATOR FOR SPACE PROPULSION APPLICATIONS

BACKGROUND OF THE INVENTION

1. Field of the Invention

This invention relates generally to catalytic gas generators and more specifically to a catalytic gas generator for electrothermal thrusters. This application is also generally related to U.S. Pat. Nos. 4,800,716; 4,856,271; and 4,938,932.

2. Description of the Related Art

The small electrothermal thrusters of the type utilized in space satellites for station-keeping purposes are generally of a design which employs a catalytic gas generator to convert a liquid propellant such as hydrazine into a propulsive power producing gas. This gas is then either directly expulsed or fed through an electrothermal thruster such as is disclosed in U.S. Pat. Nos. 4,866,929; 4,882,465; 4,926,632; 4,995,231; and 5,076,051 all assigned to the assignee of the present invention.

The typical gas generator has a catalyst bed in communication with the thrust chamber of the engine or the electrothermal thruster. The liquid propellant is diffusely injected into the catalyst bed where it is decomposed producing a high temperature gas. This high temperature gas exits from the catalyst bed and is expanded through a nozzle to produce thrust. If additional impulse energy is desired, the high temperature gas may be fed through an arcjet or resistojet prior to nozzle expansion.

One such catalytic gas generator assembly is utilized in conjunction with an arcjet thruster assembly now installed on a satellite produced by General Electric Co. for AT&T. A typical gas generator is shown in FIG. 1. The gas generator assembly 1 comprises a propellant injector body 2 connected to a catalyst chamber 3. The liquid propellant is supplied to the injector 2 via a capillary tube 4 which passes through a central bore in the injector body 2. The capillary tube 4 is brazed to a mounting flange 5 and extends through the center of injector body 2 and the tube tip is brazed in place at the outer of injector body 2. The open tube tip is adjacent to a stack of screens 6 which spreads out the liquid propellant as it exits the tube 4 and enters the catalyst chamber 3.

The catalytic decomposition reaction is exothermic. Thus substantial amount of heat is generated in the injector body 2. A thermal shunt 7, which is a V-shaped body of copper connected to a radiator fin 8, has an annular base portion brazed to the central portion of the injector body 2. The shunt 7 conducts and dissipates the heat transferred to the injector body 2 from the catalytic reaction in the catalyst chamber 3. It has been found that the useful lifetime of the gas generator is limited by embrittlement and plugging of the capillary tube 4 near the injector body 2. Accordingly, a second thermal shunt 9 is brazed to the capillary tube 4 to provide an additional path for heat dissipation in the capillary tube. This thermal shunt 9 is basically a curved copper bar having one end brazed to the capillary tube 4 and the other end bolted to the mounting flange 5. Thus, heat transmitted from the injector body 2 through the tip of the capillary tube is transferred to the mounting flange 5 through the thermal shunt 9.

This gas generator has a life expectancy of about 900 hours. This lifetime is limited due to eventual excessive nitriding degradation of the injector materials and blockage of the end of the propellant feed tube 4 due to deposition of non-volatile residues.

There is constantly a need for a more efficient gas generator and thus a design which enables a significant performance increase for use with low power arcjets and resistojets by permitting long term operation at low flow rates. Such a design would also enable the use of monopropellant grade hydrazine in electrothermal thrusters for low cost satellites.

It is therefore an object of the present invention to provide a low flow gas generator design having a long life capability of over 2,000 hours.

It is another object of the invention to provide a gas generator design which prevents feed tube blockage due to deposition of non-volatile residues.

SUMMARY OF THE INVENTION

The gas generating apparatus in accordance with the present invention comprises a catalyst chamber containing a catalyst bed and a propellant injector communicating with the catalyst chamber which has a propellant capillary tube connected to the injector body through an integral thermal standoff physically connected to the propellant capillary tube and injector body at a location substantially spaced from and thermally isolated from the injector body and the catalyst chamber.

The injector body is essentially a generally circular flange which has a central injector portion which forms one end of the catalyst chamber and an annular support portion surrounding the injector portion which provides a thermal mass to the injector body and a support platform from which the generator is mounted. The injector portion has an integral centrally disposed tubular thermal standoff around the capillary tube carrying the liquid propellant. An open end of the tubular standoff integrally joins the injector portion at an annular root area. The opposite end of the standoff is closed around and brazed to the capillary tube. Thus, the capillary tube is supported at a location spaced from the injector body.

The open end of the capillary tube is positioned in an aperture through the injector portion adjacent to a stack of screens and a circular plate over the aperture which acts as a thermal barrier between the catalyst in the thermal standoff and the catalyst bed in the catalyst chamber. In addition, the annular space between the capillary tube and the inside of the tubular thermal standoff is filled with a Shell 405 catalyst which acts as a thermal insulator.

Thus, the capillary tube is both supported at a location spaced from the injector body via the thermal standoff and the free end of the capillary tube extending into the injector body is essentially insulated from the catalyst bed. This arrangement minimizes the temperature at and near the tip of the capillary tube thus lengthening the time before nitriding degradation and blockage of the propellant feed tube due to deposition of catalyst fines and non-volatile residues inhibits gas generator function.

These and other features of the invention will become more apparent from a reading of the following detailed description when taken in conjunction with the accompanying drawing.

BRIEF DESCRIPTION OF THE DRAWING

FIG. 2 is a longitudinal sectional view of a gas generator apparatus in accordance with the present invention.

FIG. 3 is an end view of the gas generator shown in FIG. 2.

FIG. 4 is an enlarged sectional view of the injector portion of the gas generator apparatus shown in FIG. 2.

DETAILED DESCRIPTION OF THE PREFERRED EMBODIMENT

Figure 1:
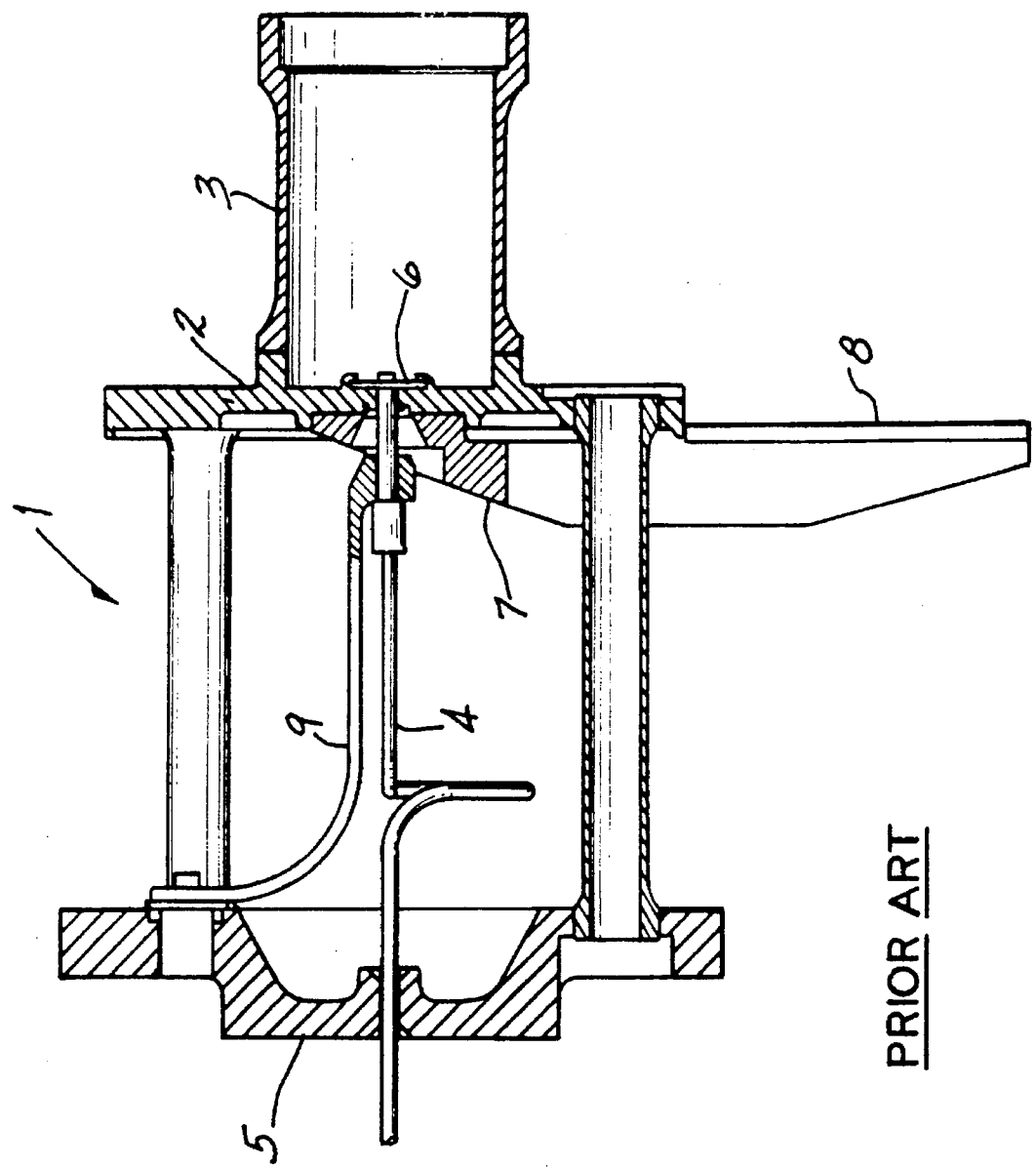
FIG. 1 is a longitudinal sectional view through a prior art gas generator assembly.

The gas generating apparatus 10 in accordance with the present invention is shown in a longitudinal sectional view in FIG. 2. Gas generating apparatus 10 comprises a generally cylindrical catalyst chamber 12 which is symmetrical about central axis A. Catalyst chamber 12 preferably packed with a coated ceramic catalyst such as Shell 405 catalyst and is closed at one end by injector body 14 which has a central injector portion 16 and an annular support portion 18. The other end of chamber 12 is closed by an outlet flange (not shown). The injector portion 16 is brazed or welded to and forms one end of the catalyst chamber 12.

A propellant capillary feed tube 20 extends into the injector portion 16 to direct propellant liquid into the catalyst chamber 12. The support portion 18 is spaced from and preferably connected to a mounting flange 19 by three circumferentially spaced tubular standoffs 22. The standoffs 22 are spaced preferably 120° apart about the support portion 18. Other support arrangements for the injector body 14 may also be used. For example, a metal tubular sleeve having a plurality of spaced apertures may be used in place of the three standoffs 22.

The injector portion 16 has a generally cup shape with a central aperture 23 closed by an integral tubular thermal standoff 24 symmetrical about axis A. Thermal standoff 24 has a closed end 48 spaced from injector portion 16 and an open end integral with injector portion 16 at a root area 26 around the aperture.

The tubular region between the standoff 24 and the feed tube 20 is packed with Shell 405 catalyst. This catalyst prevents potential propellant pooling and associated start up detonation or roughness. In addition, the catalyst is a ceramic material and therefore has a high thermal resistivity. It thus acts as a barrier to thermal conductance between the root area 26 and the propellant tube 20. The propellant feed tube 20 extends through the thermal standoff 24. The closed end of the thermal standoff 24 is brazed to the capillary feed tube 20. Injector portion 16 has an outer rim 28 brazed, welded, or otherwise integrally connected to catalyst chamber 12 and an annular inner rim 30 extending axially from said portion 16 in an opposite direction to outer rim 28. Annular inner rim 30 provides a mounting and centering ledge for a generally V-shaped thermal shunt 32.

As shown in FIG. 4, the thermal standoff 24 integrally joins with the injector portion 16 in an annular root area 26 around aperture 23. The thermal standoff 24 is radially spaced inwardly from inner rim 30. The injector body 14 comprising support portion 18, injector portion 16, and the thermal standoff 24 is preferably made from a single piece of Inconel 625. The injector thermal shunt 32 is made of pure copper or highly conductive material. Shunt 32 has an annular base 34 which fits around the inner rim 30 of the injector portion 16 and is welded or brazed to the rim 30 and to the surface of injector portion 16. The legs of the V-shaped thermal shunt 32 are brazed to or are integral with a copper radiator fin plate 33. The thermal shunt 32 essentially pulls heat away from the root area 26 of the injector portion 16 to protect the tip of the capillary tube 20 from thermal degradation effects.

A generally circular disk injector plate 36 and a stack of metal screens 38 cover the root area 26 and are fastened to the injector portion 16 by 4 equally spaced bent tabs 40. The open end of the capillary feed tube 20 extends into a central aperture 42 in the injector plate 36 so that it does not touch the injector plate 36 and does not touch the screens 38.

The injector plate 36 has 3 spaced open slots 44 circumferentially positioned its outer perimeter best as shown in FIG. 3. The injector plate 36 and screens 38 separate the catalyst in the catalyst chamber 12 from the catalyst in the tubular region 25 between the thermal standoff 24 and the capillary feed tube 20. The injector plate 36 also provides a thermal barrier between the catalyst chamber 12 and the tubular region 25. The plate 36 and screens 38 are loosely supported by the injector portion 16 via the bent tabs 40 over the periphery of the plate and screens. The three slots 44 machined in the plate's outer edge also vent the annular tubular volume 25 in the standoff 24. The screens prevent catalyst particles from blocking the exit of the feed tube 20 and potentially retard the migration of catalyst fines into the feed tube 20.

Propellant flow is controlled at the outlet of the feed tube 20 by the injector screen plate 36 and the screen stack 38. The injector plate 36 shields the thermal standoff root area 26 from the decomposition zone in the catalyst chamber 12 located in or just down stream from the injector screens 38. This plate 36 also prevents propellant circulation around the end of the feed tube 20. The plate 36 fits over the end of the feed tube 20 with a small clearance between the center aperture 42 in the plate 36 and the tube outer diameter. Propellant exiting from the feed tube is wicked into the screens 38 and along the surface of the plate 36.

When propellant, fed through capillary tube 20 past the thermal standoff 24 and to the root area 26 exits through tube tip 46, it wets the injector plate 36 and wicks therearound and into the catalyst chamber 12. The injector plate 36 also prevents the propellant from flowing back into the catalyst contained in the tubular region 25 between the thermal standoff 24 and the tube 20. This permits the catalyst contained therein to act primarily as as insulator.

Thus, primary thermal isolation of the propellant feed tube 20 is achieved by means of the integral thermal standoff 24 which is supported at the root area 26 of the injector portion 16 of the injector body 14. The standoff 24 is a thin walled extension of the injector portion 16 and is concentric around the feed tube 20. A brazed or welded connection is made between the feed tube 20 and the standoff 24 at the closed or terminal end 48 of the standoff 24.

The injector portion 16 is cooled by the thermal shunt 32 which conducts heat from the annular base portion 34 to the copper fin 33 where the heat is then dissipated radiatively to the local environment.

Heat flow to the standoff 24 is limited by the design of the standoff root area 26. First, the shunt 32 has its base 34 brazed directly to the face of the injector portion 16, adjacent the inner rim 30 which is radially spaced from the standoff 24. Second, the cross section of the injector portion 16 of the injector body 14 is minimized in the root area to preferentially conduct heat toward the shunt rather than toward the thermal standoff 24.

Referring again to FIG. 2, the capillary feed tube 20 is brazed or welded to the mounting flange 19 and to the closed end 48 of the thermal standoff 24. An expansion loop 50 is provided in the feed tube 20 to compensate for expansion and contraction of the tube during start up, cool down, and gas generator operation.

An end view of the gas generator, as viewed through the catalyst chamber 12 is shown in FIG. 3. In this view, the centrally located stack of screens 38 can be seen held in place by tabs 40. Underneath the screens 38 are shown the slots 44 in dashed lines in the injector plate 36.

The capillary tube 20 may be a single unitary tube or may have a transition 52 to a larger inner diameter 54 as tube 20 passes into the thermal standoff 24. This larger diameter portion 54 of the tube 20 provides a step and inner diameter change just upstream of the standoff braze joint to promote flow mixing and higher heat transfer rates within the tube to reduce the potential for boiling of the propellant fluid.

The life capacity of this generator is in part dependent on keeping the internal pressure high enough so that the propellant temperature is below its saturation or boiling point. The control of the internal pressure within the gas generator is provided by suitable orifacing (or other flow restriction) in the attached electric propulsion device, not shown, or on the gas generator outlet, also not shown.

While the invention has been described above with reference to a specific embodiment thereof, it is apparent that many changes, modifications and variations can be made without departing from the inventive concept disclosed herein. For example, the standoff 24 may be separately made of a different material than injector body 14 and brazed or otherwise suitably bonded to the root area 36 of the injector portion. A low thermal conductivity metal or a ceramic material could be used so long as the operational temperatures can be tolerated by the materials and the fixed connection between the feed tube 20 and the injector 14 is substantially spaced from the root area 26.

The material filling the tubular region 25 could also be other than a catalytic ceramic. Other low density, low thermal conductivity materials cold be used or the region could be left empty. Using a catalytic ceramic material provides superior performance in that pressure spiking due to propellant pooling is minimized.

The material used to fabricate the standoff and the injector could also be other than Inconel as described. Other nickel superalloys or refractory materials or similar nitriding resistant material could be used.

Accordingly, it is intended to embrace all such changes, modifications and variations that fall within the spirit and broad scope of the appended claims. All patent applications, patents and other publications cited herein are incorporated by reference in their entirety.

We claim:

1. A catalytic gas generator for an electrothermal thruster comprising:

a gas generating chamber containing a catalytic bed;

a propellant feed tube adapted to provide a flow of propellant fluid to said catalytic bed;

an injector portion adapted to receive one end of said feed tube communicating with said gas generating chamber, said injector portion comprising an elongated tubular thermal standoff having one end connected to said feed tube at a location spaced from said gas generating chamber and another end connected at said gas generating chamber, wherein said location is thermally separated from said gas generating chamber.

2. The gas generator according to claim 1 wherein said tube in said standoff forms an annulus therebetween.

3. A catalytic gas generator for an electrothermal thruster comprising:

a gas generating chamber containing a catalytic bed;

a propellant feed tube adapted to provide a flow of propellant fluid to said catalytic bed; and a propellant injector adapted to receive one end of said feed tube communicating with said gas generating chamber, said injector comprising a support portion and an injector portion including an elongated tubular thermal standoff having one end connected to said tube at a location spaced from said gas generating chamber and another end forming a root area of said injector portion around a central aperture into which one end of said tube passes forming an annulus therebetween and said annulus is filled with a catalytic ceramic material.

4. The gas generator according to claim 1 further comprising a generally flat injector plate over said aperture and spaced from said tube end.

5. The gas generator according to claim 3 wherein said plate separates said catalyst bed from said catalyst in said thermal standoff.

6. The gas generator according to claim 5 wherein said plate has at least one slot to vent said annulus in said thermal standoff to said catalyst chamber.

7. The gas generator according to claim 1 wherein said thermal standoff and said injector portion are made of inconel.

* * * * *